(12) United States Patent
Kawamura

(10) Patent No.: US 8,412,036 B2
(45) Date of Patent: Apr. 2, 2013

(54) IMAGING APPARATUS AND METHOD OF CONTROLLING THE APPARATUS

(75) Inventor: Takashi Kawamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 111 days.

(21) Appl. No.: 13/147,886

(22) PCT Filed: Dec. 3, 2010

(86) PCT No.: PCT/JP2010/007061
§ 371 (c)(1),
(2), (4) Date: Aug. 4, 2011

(87) PCT Pub. No.: WO2011/070757
PCT Pub. Date: Jun. 16, 2011

(65) Prior Publication Data
US 2011/0292364 A1  Dec. 1, 2011

(30) Foreign Application Priority Data

Dec. 7, 2009 (JP) ................................. 2009-277639

(51) Int. Cl.
*G03B 13/36* (2006.01)
(52) U.S. Cl. ........................................................ 396/133
(58) Field of Classification Search ................... 396/133
See application file for complete search history.

(56) References Cited

U.S. PATENT DOCUMENTS

| | | | |
|---|---|---|---|
| 5,124,842 A | 6/1992 | Honda et al. | |
| 5,148,502 A | 9/1992 | Tsujiuchi et al. | |
| 5,227,831 A * | 7/1993 | Miyazaki et al. | 396/77 |
| 5,237,363 A * | 8/1993 | Okada et al. | 396/55 |
| 5,253,007 A * | 10/1993 | Tokura et al. | 396/133 |

(Continued)

FOREIGN PATENT DOCUMENTS

| | | |
|---|---|---|
| DE | 2301800 | 10/1974 |
| JP | 5-27084 | 4/1985 |
| JP | 3084130 | 9/2000 |
| JP | 3191928 | 7/2001 |
| JP | 2003-259194 | 9/2003 |

(Continued)

OTHER PUBLICATIONS

International Search Report issued Jan. 18, 2011 in International (PCT) Application No. PCT/JP2010/007061.

(Continued)

*Primary Examiner* — W. B. Perkey
(74) *Attorney, Agent, or Firm* — Wenderoth, Lind & Ponack, L.L.P.

(57) ABSTRACT

An imaging apparatus (1000) includes: an imaging device (110), a lens (120), an initial focal point detecting unit (130) detecting a positional relationship between the imaging device (110) and the lens (120) to specify an initial focal point which is a focal point found when an exposure start instruction is received from a user; a shift pattern determining unit (140) determining a shift pattern of the focal point, such that the focal point in an exposure time moves from the initial focal Point, passes through both of a nearest end and a farthest end of a predetermined range of focus at least once, and returns to the initial focal point, the initial focal point being specified by the positional relationship between the imaging device (110) and the lens (120); and a shift control unit (150) moving one of the imaging device (110) and the lens (120) based on the shift pattern, such that the focal point moves from the initial focal point as soon as exposure starts, and arrives at the initial focal point again as soon as the exposure ends.

8 Claims, 13 Drawing Sheets

U.S. PATENT DOCUMENTS

| | | | | |
|---|---|---|---|---|
| 5,666,570 | A | * | 9/1997 | Ohsawa ............... 396/147 |
| 5,812,888 | A | * | 9/1998 | Kirigaya et al. ........... 396/80 |
| 2008/0013941 | A1 | | 1/2008 | Daley |
| 2008/0158376 | A1 | | 7/2008 | Miki |
| 2009/0097836 | A1 | * | 4/2009 | Tanaka et al. ............ 396/106 |
| 2011/0292275 | A1 | * | 12/2011 | Kawamura ............. 348/345 |
| 2011/0292364 | A1 | * | 12/2011 | Kawamura ............... 355/55 |
| 2012/0026360 | A1 | * | 2/2012 | Imamura .............. 348/229.1 |

FOREIGN PATENT DOCUMENTS

| | | |
|---|---|---|
| JP | 2004-153497 | 5/2004 |
| JP | 2007-286118 | 11/2007 |
| JP | 2008-166947 | 7/2008 |
| JP | 2009-10521 | 1/2009 |
| JP | 2009-98351 | 5/2009 |
| JP | 2009-139867 | 6/2009 |
| JP | 2009-213032 | 9/2009 |

OTHER PUBLICATIONS

E.R. Dowski and W.T. Cathey, "*Extended depth of field through wave-front coding*", Applied Optics, vol. 34, No. 11, p. 1859-1866 (1995).

A. Levin, R. Fergus, F. Durand and W.T. Freeman, "*Image and Depth from a Conventional Camera with a Coded Aperture*", ACM Transactions on Graphics, vol. 26, No. 3, Article 70, 70-1-70-9 (2007).

H. Nagahara, S. Kuthirummal, C. Zhou and S. Nayar, "*Flexiable Depth of Field Photography*", European Conference on Computer Vision (ECCV), Oct. 16, Morning Session 2: Computational Photography (2008).

C. Tisse, H.P. Nguyen, R. Tessieres, M. Pyanet and F. Guichard, "*Extended depth-of-field (EDOF) using sharpness transport across colour channels*", Optical Engineering+Applications, Part of SPIE Optics+Photonics, Session 1—Imaging in the Optical Design Process: Depth of Field (2008).

W. Chi and N. George, "*Computational imaging with the logarithmic asphere: theory*", Optical Society of America, vol. 20, No. 12, Dec. 2003.

Y. Takahashi and S. Komatsu, "*Optimized free-form phase mask for extension of depth of field in wavefront-coded imaging*", Optical Society of America, Optics Letters, vol. 33, No. 13, Jul. 1, 2008.

Y. Takahashi et al., "*Optimized phase mask for wave-front coding: Extended DOF in off axis field*", with English translation, Optics & Photonics Japan 2007, p. 464-465 (27pC2), 2007.

* cited by examiner

IMAGING APPARATUS AND METHOD OF CONTROLLING THE APPARATUS

TECHNICAL FIELD

The present invention relates to imaging apparatuses and methods of controlling the imaging apparatuses to achieve an extended depth of field, and in particular, to an imaging apparatus and an imaging method to achieve a shorter shutter time lag.

BACKGROUND ART

There are three main typical techniques to achieve an extended depth of field (hereinafter referred to as EDOF). The first technique (See Non Patent Literature 1) employs an optical element, referred to as a phase plate, inserted in the optical system in order to make a blur uniform in the scene depth direction. Then, the technique executes image-restoration processing on an image obtained through the blur uniformity, using a previously-measured blur pattern or a calculated blur pattern based on a simulation. Hence, the technique generates an EDOF image. This technique is introduced as the Wave-front coding (hereinafter referred to as the WFC).

The second technique (See Non Patent Literature 2) employs an aperture of which pattern is modified, so that the distance to the focal plane is accurately measured for each of subregions of the image. Then, the technique executes image-restoration processing on each subregion, using a blur pattern which is based on each of previously-measured distances to a corresponding one of the subregions. Hence, the technique generates an EDOF image. This technique is introduced as the Coded Aperture (hereinafter referred to as the CA).

The third technique (See Non Patent Literature 3) involves shifting a focus lens or an imaging device during the exposure time in order to convolve images which are uniformly focused in the scene depth direction (in other words, obtaining a uniform blur in the scene depth direction). Then, the technique executes image-restoration processing on the image obtained through convolution, using a previously-measured blur pattern or a calculated blur pattern based on a simulation. Hence, the technique generates an EDOF image. This technique is introduced as the Flexible DOF (hereinafter referred to as the F-DOF).

There are other techniques than the above techniques. One of the techniques (Non Patent Literature 4) involves estimating the depth and detecting the sharpness of the image, taking advantage of the on-axis chromatic aberration, and generating an all-focus image with image processing. Another technique (Non Patent Literature 5) involves making a uniform blur in the scene depth direction using a multifocal lens, and executing image-restoration processing on the image obtained through the uniformity using a previously-measured blur pattern or a calculated blur pattern based on a simulation. Compared with the first three techniques, however, the next two techniques fail to achieve as large an EDOF as the three techniques do.

In addition, there has been another technique referred to as the focal stack. This technique involves obtaining images each having a different focal point (focal position), and extracting a region-to-be-focused from each of the images. Then, the technique composes the extracted images to generate an EDOF image. Unfortunately, the technique requires many images to be obtained. Thus, the technique inevitably needs a relatively-long time period for obtaining the images, and occupies too much memory.

Various kinds of phase plates are proposed for one of the first three techniques, the WFC. Among the phase plates, the cubic phase mask (hereinafter referred to as the CPM) and the free-form phase mask (hereinafter referred to as the FPM) are introduced as the phase plates for obtaining the largest EDOF. In view of the image quality of the restored image (fewer aritifacts), the FPM is more promising than the CPM (Non Patent Literature 6).

As a weakness of the WFC, however, the phase plate inserted in the optical system tends to deteriorate the off-axis performance of the lens (Non Patent Literature 7). Specifically, the WFC cannot obtain as much a uniform blur with respect to incident light coming from other than the front as a uniform blur with respect to incident light coming from the front. As a result, when an image is restored with a use of an on-axis blur pattern, the off-axis quality of the restored image inevitably deteriorates.

The second technique among the first three techniques; namely the CA, employs an aperture having a modified pattern in order to increase the accuracy of the distance measurement. Due to the modified pattern inherent in the aperture of the technique, specific frequency components are lost from an obtained image and a restored image. In other words, the technique suffers image deterioration. Furthermore, the technique is not suitable for imaging in the dark since an amount of received light in the technique is typically less than that in an ordinary technique no matter how the shape of the aperture is to be modified.

The third of the first three techniques, the F-DOF, enjoys the most excellent image quality among all the three techniques, and achieves a large EDOF. The off-axis performance depends on the performance of the lens itself, which makes it easy to enhance the performance of the imaging apparatus. As an optical condition, however, the technique needs to employ an image-space telecentric lens since the same object needs to be convolved on the same position of the image even though the focal position shifts during the exposure.

The oldest application of the above EDOF technique is the one to microscopes. In the case of a microscope, the focal stack technique has long been used because a user can take time to obtain an image of a still object. The focal stack technique, however, requires much time and work as described above. Hence the EDOF has been disclosed in some references along with the F-DOF technique (Patent Literatures 1 to 4). When the F-DOF is used for the microscope, disclosed are the cases where, during the exposure, (i) a specimen; namely the object, is moved and (ii) the microscope tube is moved.

Based on the premise of image-restoration processing after the exposure, it is reasonable to control the move such that a uniform blur is formed at all times on the object, since an image-restoration processing technique employing a single blur pattern is available (Patent Literature 5). In order to control the move, the object to be moved should be moved at a constant speed in the case where the object is the imaging device. In the case where the focus lens is moved, the focus needs to be shifted as fast as the image plane shifting at a constant speed (Non Patent Literature 3). It is noted that the focus lens may be shifted from the far-end focal point to the near-end focal point and visa versa.

Recently, the EDOF has also been applied to a camera for cellular phones. The use of the EDOF technique for the camera contributes to making the camera smaller. In other words, the EDOF successfully obtains an all-focus image (all the objects in the image are focused) without an autofocus system.

In view of the application of the above techniques, the F-DOF itself is not adopted since the F-DOF requires a mechanism to shift the focus lens or the imaging device. Hence adopted is the WFC or the technique utilizing the on-axis chromatic aberration.

Another application to be considered is the one to regular digital still cameras and digital video cameras. In recent years, users have been looking for more user-friendly and further foolproof digital still cameras and digital video cameras. The EDOF technique is promising since the technique achieves an all-focus image, freeing a user from obtaining an out-of-focus image.

In view of the application, the most excellent technique of all of the above techniques is the F-DOF since the F-DOF has the following features:(i) high image quality is available, (ii) the EDOF effect and the range of focus can be changed at the user's option, (iii) the technique is feasible with the application of a regular autofocus mechanism (no special optical system is required), and (iv) the user can easily switch between EDOF shooting and the regular shooting.

CITATION LIST

Patent Literature

[PLT 1] DE2301800 (West Germany Patent: Filed Jan. 15, 1973)
[PTL 2] Japanese Examined Patent Application Publication No. 05-27084
[PTL 3] Japanese Patent No. 3191928
[PTL 4] US 2008/0013941
[PTL 5] Japanese Patent No. 3084130

Non Patent Literature

[NPL 1] E. R. Dowski and W. T. Cathey, "Extended depth of field through wave-front coding", Applied Optics, Vol. 34, No. 11, pp. 1859-1866 (1995).

[NPL 2] A. Levin, R. Fergus, F. Durand and W. T. Freeman, "Image and Depth from a Conventional Camera with a Coded Aperture", ACM Transactions on Graphics, Vol. 26, No. 3, Article. 70, 70-1-70-9 (2007).

[NPL 3] H. Nagahara, S. Kuthirummal, C. Zhou and S. Nayar, "Flexible Depth of Field Photography", European Conference on Computer Vision (ECCV), October 16, Morning Session 2: Computational Photography (2008).

[NPL 4] C. Tisse, H. P. Nguyen, R. Tesieres, M. Pyanet and F. Guichard, "Extended Depth-of-field (EDOF) using sharpness transport across color channels", Optical Engineering+Applications, Part of SPIE Optics+Photonics, Session 1—Imaging in the Optical Design Process: Depth of Field (2008).

[NPL 5] W. Chi and N. George, "Computational imaging with the logarithmic asphere: theory", Optical Society of America, Vol. 20, No. 12, December (2003).

[NPL 6] Y. Takahashi and S. Komatsu, "Optimized free-form phase mask for extension of depth of field in wavefront-coded imaging", Optical Society of America, Optics Letters, Vol. 33, No. 13, Jul. 1, (2008).

[NPL 7] Y. Takahashi, R. Obana, and S. Komatsu, "Optimized phase mask for wave-front coding: Extended DOF in off axis field", Optics and Photonics Japan 2007, Extended Abstracts, pp. 464-465 (27p C2), (2007).

SUMMARY OF INVENTION

Technical Problem

As described above, the F-DOF is most promising among various EDOF techniques for digital still cameras. FIGS. 13 and 14 show structures required to achieve the F-DOF.

FIG. 13 is a block diagram showing a structure of an imaging apparatus 500 shifting a focus lens during the exposure time. The imaging apparatus 500 shown in FIG. 13 includes an imaging device 1, a lens 2, a focus lens 20, a shutter 3, a focus lens shift control unit 4, a shutter operation instructing unit 5, a release receiving unit 6, a focus lens initial position detecting unit 7, an exposure time determining unit 8, a focus lens position resetting unit 18, an exposure and focus shift synchronization managing unit 10, an image-restoration processing unit 11, a PSF storage unit 12, and an image data recording unit 13.

In the imaging apparatus 500 shown in FIG. 13, when the release receiving unit 6 receives an exposure start instruction from a user, the focus lens initial position detecting unit 7 detects the position of the focus lens 20 at that time (the initial position). Then the focus lens shift control unit 4 moves the focus lens 20 so that the focal point moves to an end point found at a predetermined range of focus; that is the nearest end shown in FIG. 15, for example. Here, in the predetermined range of focus and with respect to the imaging apparatus 500, the nearest end is at the nearest distance to the imaging apparatus 500, and the farthest end is at the farthest distance from the imaging apparatus 500.

Next, the exposure and focus shift synchronization managing unit 10 gives the shutter operation instructing unit 5 an instruction to operate the shutter 3. Simultaneously, the exposure and focus shift synchronization managing unit 10 gives focus lens shift control unit 4 an instruction to move the focus lens 20 from the nearest end to the farthest end. Then, as shown in FIG. 15, the focus lens shift control unit 4 moves the focus lens 20 so that the focal point arrives at the farthest end as soon as the exposure ends.

FIG. 14 is a block diagram showing a structure of an imaging apparatus 600 which shifts the imaging device 1 during the exposure time. The imaging apparatus 600 shown in FIG. 14 does not include the focus lens shift control unit 4 included in the imaging apparatus 500 and shifting the focus lens 20, the focus lens initial position detecting unit 7, the exposure and focus shift synchronization managing unit 10, and the focus lens position resetting unit 18. Instead, the imaging apparatus 600 includes an imaging device initial position detecting unit 14, an exposure and imaging device shift synchronization managing unit 16, an imaging device shifting control unit 17, and an imaging device position resetting unit 19.

In other words, the imaging apparatus 600 in FIG. 14 is different from the imaging apparatus 500 in FIG. 13 in that the imaging apparatus 600 moves the imaging device 1 to shift the focal point, while the imaging apparatus 500 moves the focus lens 20. Otherwise, the imaging apparatus 600 in FIG. 14 and the imaging apparatus 500 in FIG. 13 share structures and operations other than the above structures and operations. Thus the constituent features which correspond with each other have identical numeral references, and details thereof shall be omitted. Furthermore, the imaging apparatus 600 also includes the lens 2 including the focus lens 20 whose details shall be omitted.

Specifically, the F-DOF-based imaging apparatuses 500 and 600 need to reset the position of the focus lens 20 or the imaging device between the time when the shutter button is pressed and the time when the exposure actually starts. As seen above, the F-DOF suffers a significant disadvantage compared with other EDOFs in view of reducing the shutter time lag. The shutter time lag is an interval between the time when the user gives the exposure start instruction (in other words, when the user press the shutter) and the time when the exposure actually starts, as shown in FIG. 16.

In the case of an auto-focus camera, the shutter time lag is the sum of a time required to obtain the focus and a time (referred to as a release time lag) required to carry out other various processing. In the case of a camera having a mirror, such as a single-lens reflex camera, the release time lag includes a time required for the mirror to bounce, and a time required to close the blades of the diaphragm based on a determined exposure. It is noted that a normal shutter time lag is between 100 msec and several seconds whereas a release time lag is between 10 msec and 130 msc. Hence the auto-focusing operation takes much more time than the shutter-releasing operation.

Other techniques than the F-DOF (the WFC and the CA, for example) can obtain all-focus images without the auto-focus mechanism itself. Accordingly, the techniques can reduce a time for obtaining the focus. As a result, the shutter time lag can be significantly reduced. The F-DOF based imaging apparatuses 500 and 600 can obtain all-focus images, as well as carry out the auto-focus capturing and the manual-focus capturing. On the other hand, the imaging apparatuses 500 and 600 have to move the focus lens 20 or the imaging device 1 during the exposure from the far-end focal point to the near-end focal point or visa versa. Hence, before the exposure starts, the focus lens 20 or the imaging device 1 needs to be moved to the initial position; namely, the far-end focal point or the near-end focal point.

For example, assume the case where the imaging apparatus 500 or 600 comes into focus at a focal point in the regular auto-focus capturing or the manual-focus capturing. When the user desires to obtain an all-focus image immediately after obtaining the focal point in the regular auto-focus capturing or the manual-focus capturing, the focus lens needs to be reset as described above. This operation prevents the exposure from starting soon.

Typically, one of the EDOF's easily-assumed greatest assets for the user is to significantly reduce the shutter time lag; that is to bring an advantage in that the user can release the shutter at the moment he or she desires to capture the scene, as well as to obtain an all-focus image and free the user from obtaining an out-of-focus image. In the F-DOF, unfortunately, the processing is carried out in the above sequence in a conventional structure. Hence the F-DOF fails to obtain the former advantage.

It is noted that this problem is peculiar to digital cameras or digital cameras in conformity with the structures of the digital cameras, not for conventional microscopes or a small camera for cellular phones (no auto-focus mechanism).

The present invention is conceived in view of the above problem and has an object to provide an imaging apparatus and an imaging method having a small shutter time lag in the F-DOF.

Solution to Problem

An imaging apparatus according to an aspect of the present invention includes: an imaging device; a lens which collects light on the imaging device, and forms an image; an initial focal point detecting unit which detects a positional relationship between the imaging device and the lens to specify an initial focal point which is a focal point found when an exposure start instruction is received from a user; a shift pattern determining unit which determines a shift pattern of the focal point, such that the focal point in an exposure time moves from the initial focal point, passes through both of a nearest end and a farthest end of a predetermined range of focus at least once, and returns to the initial focal point, the initial focal point being specified by the positional relationship (i) determined by the initial focal point detecting unit, and (ii) observed between the imaging device and the lens; and a shift control unit which moves one of the imaging device and the lens based on the shift pattern determined by the shift pattern determining unit, such that the focal point moves from the initial focal point as soon as exposure starts, and arrives at the initial focal point again as soon as the exposure ends.

The above structure does not require the time for resetting the focal point in the F-DOF, contributing to a significant reduction in the shutter time lag. It is noted that either the nearest end or the farthest end may be first to be passed by the focal point. Moreover, both of the nearest end and the farthest end may be passed two or more times instead of once each. It is noted that the nearest end and the farthest end are preferably passed with the equal number of times.

The imaging apparatus may further include an exposure time determining unit which determines the exposure time according to an imaging scene. The shift pattern determining unit may increase the number of reciprocal travels as the exposure time determined by the exposure time determining unit is longer, the number of reciprocal travels indicating frequency of the shift pattern to be carried out during the exposure time. This operation makes the shift speed of the imaging device or the lens uniform even when the exposure time changes. Accordingly, the burden on a driving device, such as a motor, is light.

As an example, the shift pattern determining unit may determine the shift pattern of the focal point, such that the focal point in the exposure time moves in the order of the initial focal point, the nearest end of the range of focus, and the farthest end of the range of focus, and returns again to the initial focal point.

As another example, the shift pattern determining unit may determine the shift pattern of the focal point, such that the focal point in the exposure time moves in the order of the initial focal point, the farthest end of the range of focus, and the nearest end of the range of focus, and returns again to the initial focal point.

The above structure makes possible securing certain exposure between the nearest end and the farthest end. This contributes to a significant reduction in the shutter time lag, while maintaining the EDOF effect in the F-DOF.

As an example, the shift control unit may shift the focal point by moving the lens. As another example, the shift control unit may shift the focal point by moving the imaging device.

Thus two techniques, moving the lens and moving the imaging device, are considered as specific examples of changing the focal point. Here an imaging apparatus having an auto-focus mechanism may adopt the technique to move the lens, so that the lens-moving mechanism can be incorporated into the auto-focus mechanism.

Furthermore, the imaging apparatus may include a Point Spread Function (PSF) storage unit which stores a restoration PSF in advance; an image-restoration processing unit which carries out image-restoration processing on image data generated by the imaging device, using the restoration PSF; and an image data recording unit which records an image restored by the image-restoration processing unit.

An imaging method according to another aspect of the present invention is the method of an imaging apparatus obtaining an image, the imaging apparatus including an imaging device and a lens which collects light on the imaging device, and forms an image. Specifically, to the method includes: detecting a positional relationship between the imaging device and the lens to specify an initial focal point which is a focal point found when an exposure start instruction is received from a user; determining a shift pattern of the focal point, such that the focal point in an exposure time moves from the initial focal point, passes through both of a nearest end and a farthest end of a predetermined range of focus at least once, and returns to the initial focal point, the initial focal point being specified by the positional relationship (i) determined in said detecting, and (ii) observed between the imaging device and the lens; and moving one of the imaging device and the lens based on the shift pattern determined in said determining, such that the focal point moves from the initial focal point as soon as exposure starts, and arrives at the initial focal point again as soon as the exposure ends.

It is noted that, instead of providing the imaging apparatus and the imaging method, the present invention can provide a program to cause a computer to execute the characteristic steps included in the imaging method. In addition, the present invention can provide a large-scale integration (LSI) which carries out some of the functions of the imaging apparatus. Such a program can be distributed via a non-transitory computer-readable recording medium such as a CD-ROM, and a transmission medium such as the Internet.

Advantageous Effects of Invention

The present invention contributes to a significant reduction in a shutter time lag in the F-DOF by employing a devised technique to move an imaging device or a focus lens during exposure.

DESCRIPTION OF EMBODIMENTS

Described hereinafter are the embodiments of the present invention, with reference to the drawings.

Embodiment 1

An imaging apparatuses according to Embodiment 1 of the present invention shall be described with reference to FIGS. 1 to 10.

Figure 1:
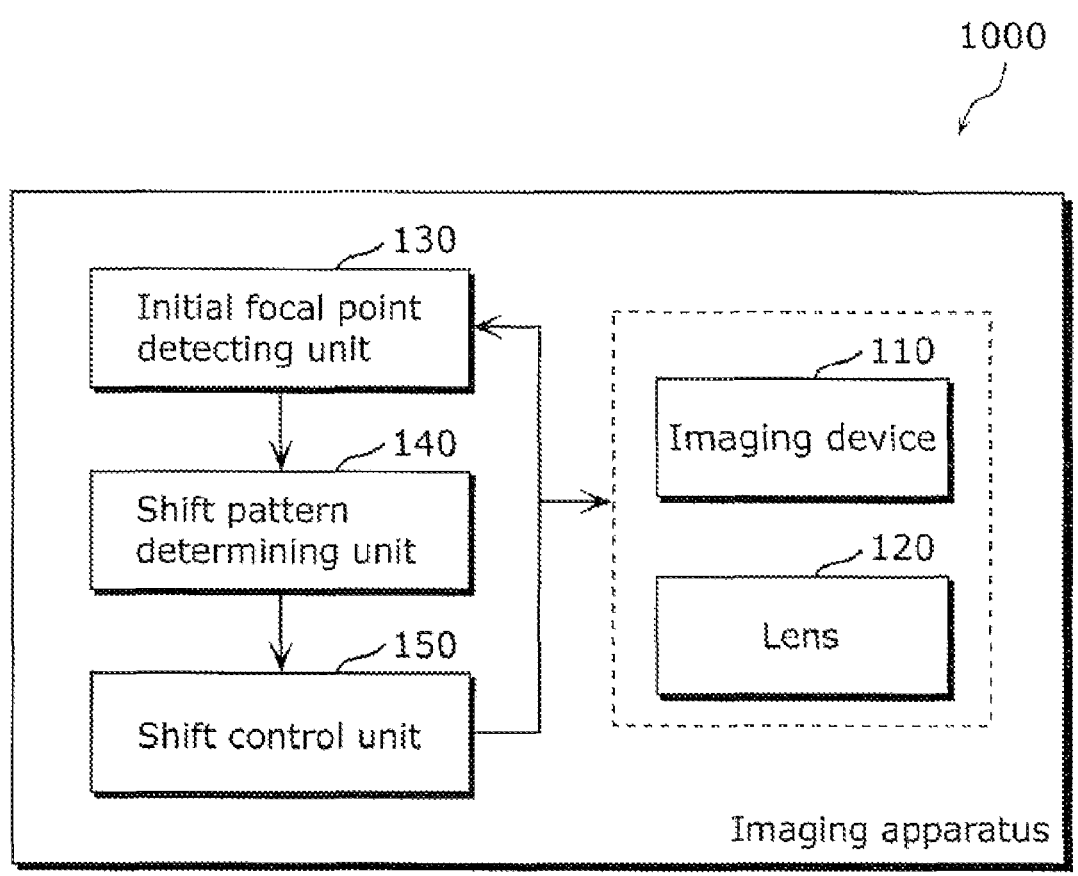
FIG. 1 depicts a block diagram showing a schematic structure of an imaging apparatus according to Embodiment 1 of the present invention.
Figure 2:
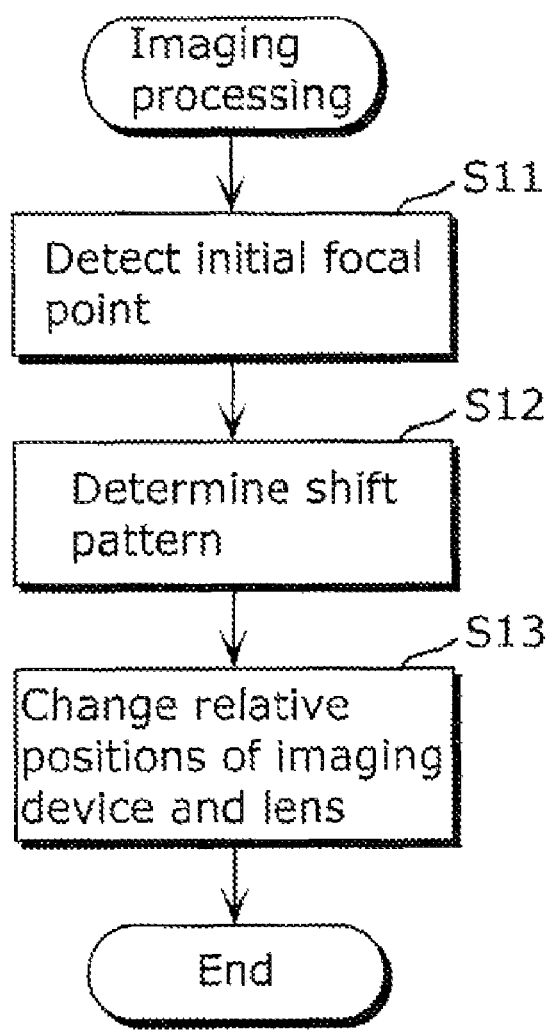
FIG. 2 depicts a flowchart showing an operation of the imaging apparatus in FIG. 1.

Described first is a structure and an operation of an imaging apparatus 1000 according Embodiment 1 of the present invention, with reference to FIGS. 1 and 2. It is noted that FIG. 1 is a block diagram showing a schematic structure of the imaging apparatus 1000. FIG. 2 is a flowchart showing an operation of the imaging apparatus 1000. As shown in FIG. 1, the imaging apparatus 1000 includes an imaging device 110, a lens 120, an initial focal point detecting unit 130, a shift pattern determining unit 140, and a shift control unit 150.

The imaging device 110 converts a formed image to an electric signal. A specific example of the imaging device 110 is not limited, in particular. For example, a charge coupled device image sensor (CCD), or a complementary metal oxide semiconductor image sensor (CMOS) may be adopted as the imaging device 110.

The lens 120 collects light on the imaging device 110, and forms the image. The lens 120 includes, for example, two or more lenses including a focus lens.

The initial focal point detecting unit 130 detects an initial focal point (hereinafter also referred to as a "focal initial position") (S11). The initial focal point is a focal point of the imaging apparatus 1000 (hereinafter also referred to as a "focal position") found when an exposure start instruction is sent from the user. It is noted that the focal point is determined based on a positional relationship (to be more specific, a distance) between the imaging device 110 and the lens 120. In other words, the initial focal point detecting unit 130 actually detects the positional relationship between the imaging device 110 and the lens 120 in order to specify the initial focal point.

The shift pattern determining unit 140 determines the shift pattern of the focal point such that the focal point in the exposure time moves from the initial focal point, passes through both of the nearest end and the farthest end of a predetermined range of focus at least once, and comes back to the initial focal point (S12). Here the initial focal point is specified by the positional relationship, between the imaging device 110 and the lens 120, detected by the initial focal point detecting unit 130.

It is noted that the shift pattern determined here may allow a prior passage of the focal point through either the nearest end or the farthest end of the range of focus. In other words, the shift pattern may involve moving the focal point in the exposure time in the order of the initial focal point, the nearest end of the range of focus, and the farthest end of the range of focus, and coming back to the initial focal point again. Furthermore, the shift pattern may involve moving the focal point in the exposure time in the order of the initial focal point, the farthest end of the range of focus, and the nearest end of the range of focus, and coming back to the initial focal point again.

Moreover, the shift pattern determining unit 140 determines the number of reciprocal travels indicating the frequency of the shift pattern to be carried out during the exposure time. Then the shift pattern determining unit 140 increases the number of reciprocal travels as the exposure time determined by an after-described exposure time determining unit is longer. For example, when the number of reciprocal travels is once in the case where the exposure time is 10 ms, the number of reciprocal travels is made twice in the case where the exposure time is 20 ms. This operation makes the shift speed of the imaging device 110 or the lens 120 practically constant even when the exposure time changes. Accordingly, the burden on a driving device, such as a motor, is light.

In order to change the focal point based on the shift pattern determined by the shift pattern determining unit 140, the shift control unit 150 moves one of the imaging device 110 and the lens 120 to change the distance therebetween (the relative position) (S13). Specifically, the shift control unit 150 moves one of the imaging device 110 and the lens 120, such that the focal point moves from the initial focal point as soon as (immediately when) the exposure starts, and arrives at the initial focal point again as soon as (immediately when) the exposure ends.

It is noted that the phrase "as soon as the exposure starts (the exposure ends)" does not require strict synchronism. Tolerable is an error including a time lag between the time when a control signal is received and the driving device starts to drive. Moreover, the shift control unit 150 may shift the focal point by moving either the imaging device 110 or the lens 120.

Figure 3:
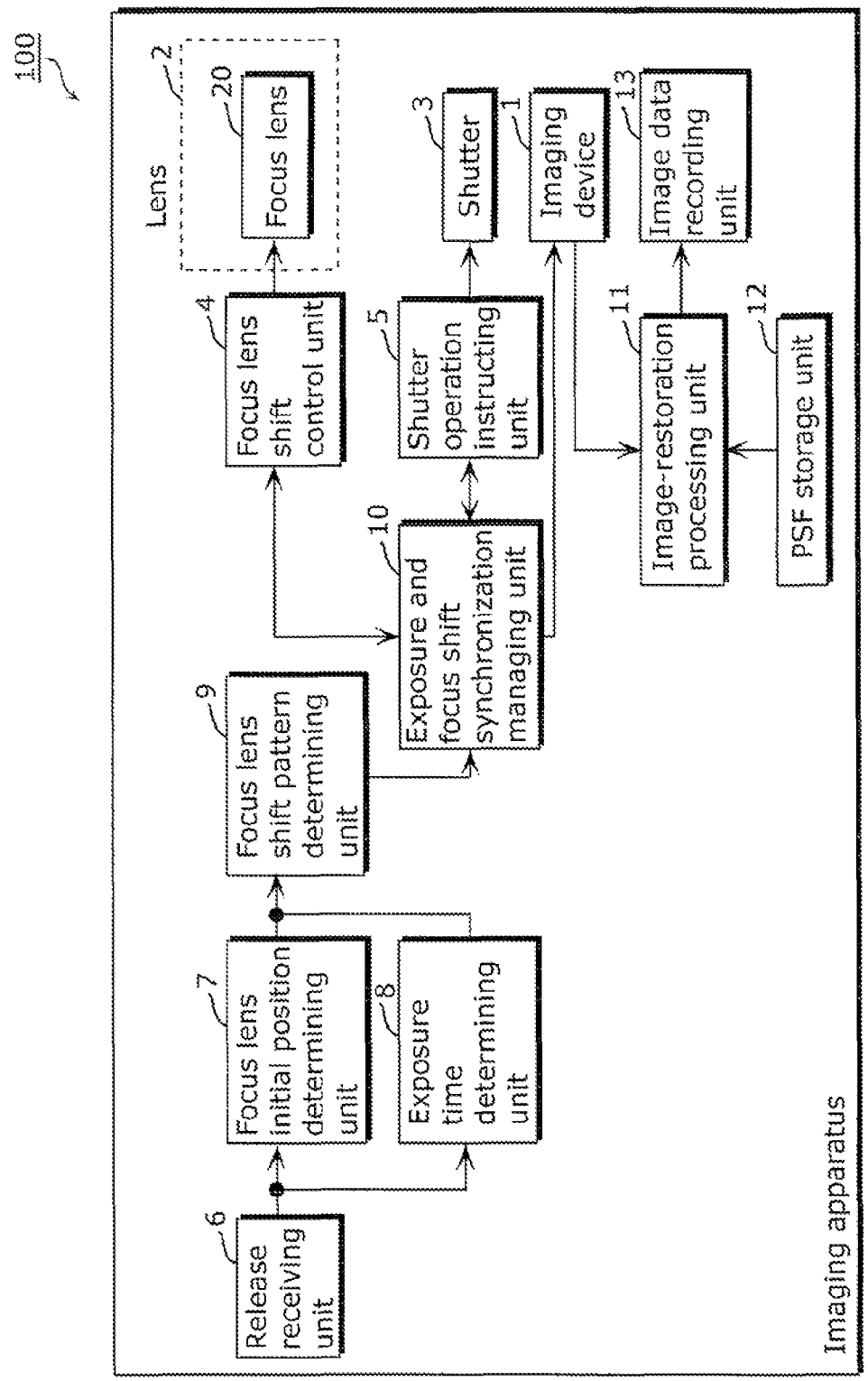
FIG. 3 depicts a block diagram showing a detailed structure of an imaging apparatus according to Embodiment 1 of the present invention.

FIG. 3 shows a detailed structure of an imaging apparatus 100 according to Embodiment 1. The imaging apparatus 100 in FIG. 3 includes the imaging device 1, the lens 2, the focus lens 20, the shutter 3, the focus lens shift control unit 4, the shutter operation instructing unit 5, the release receiving unit 6, the focus lens initial position detecting unit 7, the exposure time determining unit 8, a focus lens shift pattern determining unit 9, the exposure and focus shift synchronization managing unit 10, the image-restoration processing unit 11, the PSF storage unit 12, and the image data recording unit 13.

It is noted that the following constituent features in FIGS. 1 and 3 correspond with each other: the imaging device 110 with the imaging device 1, the lens 120 with the lens 2, the initial focal point detecting unit 130 with the focus lens initial position detecting unit 7, the shift pattern determining unit 140 with the focus lens shift pattern determining unit 9, and the shift control unit 150 with the focus lens shift control unit 4.

Figure 4:
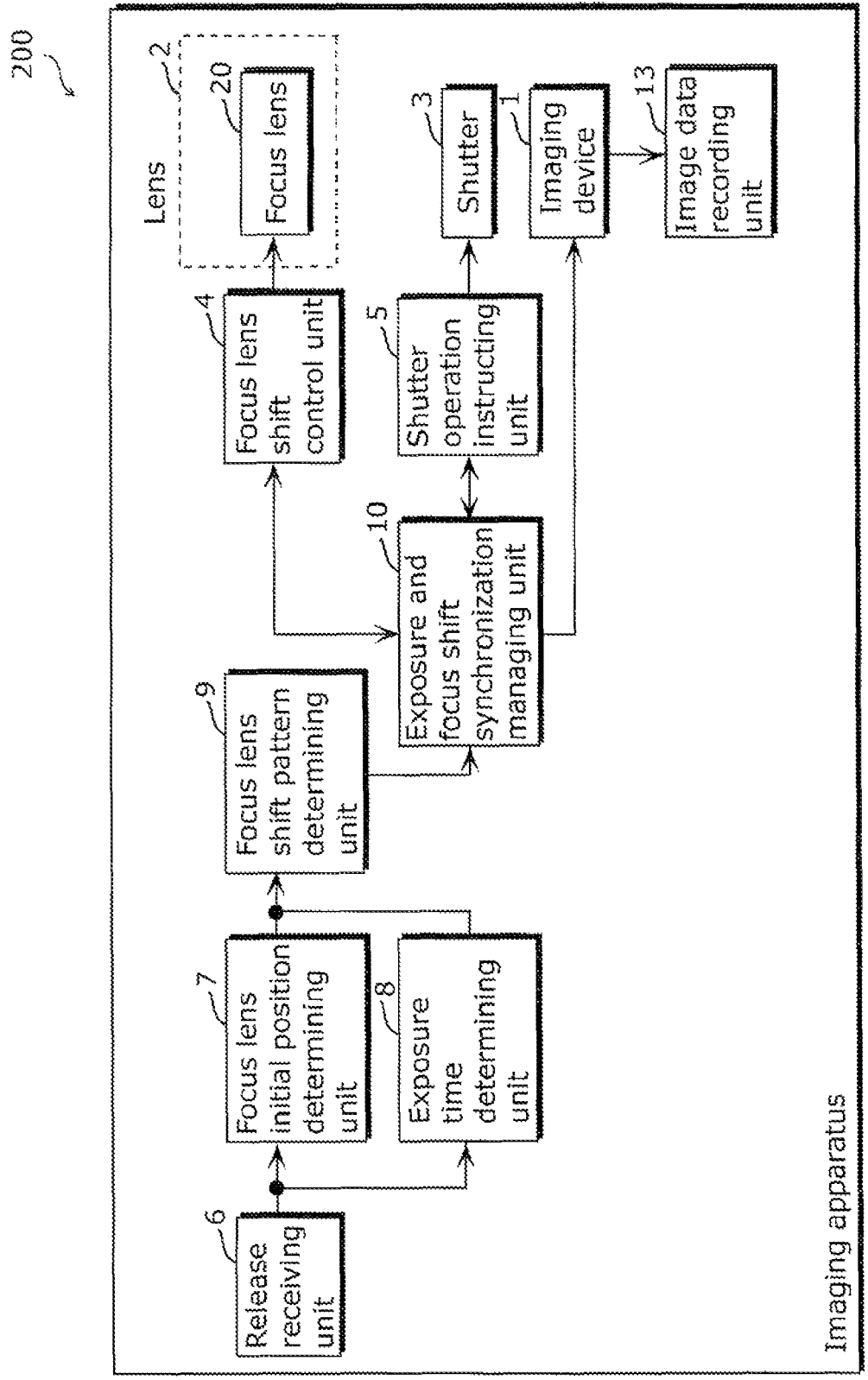
FIG. 4 depicts a block diagram showing a detailed structure of an imaging apparatus according to Embodiment 1 of the present invention.

FIG. 4 shows a detailed structure of an imaging apparatus 200 according to Embodiment 1. Other than the fact that the image-restoration processing unit 11 and the PSF storage unit 12 are omitted from the imaging apparatus 200, the structure and effects of the imaging apparatus 200 are similar to those of the imaging apparatus 100 shown in FIG. 3. Compared with the imaging apparatus 100 shown in FIG. 3, the imaging apparatus 200 is characterized by directly recording, on the image data recording unit 13, an image obtained through the exposure. This structure intends to achieve the image-restoration processing to be executed not in the imaging apparatus 200 but on an external apparatus, such as a personal computer, an image viewer, or a network server. Other part of the structure of the imaging apparatus 200 is similar to that of the imaging apparatus 100 in FIG. 3. Thus mainly described hereinafter are the structure and the operation of the imaging apparatus 100.

In the above-structured imaging apparatus 100, when the shutter 3 opens, and the lens 2 forms the optical image of the object on the imaging device 1, the formed optical image is converted to an electric signal by the imaging device 1. It is noted that the lens 2 typically includes the focus lens 20 and a group of lenses other than the focus lens 20 such that a desired object is focused in optical image forming. The focus lens 20 may include two or more lenses.

When the release receiving unit 6 receives an exposure start instruction from the user, the focus lens initial position detecting unit 7 detects the position of the focus lens 20 at that time (the initial position).

The exposure time determining unit 8 determines capturing parameters including a shutter speed (exposure time) and an f-number. The exposure time may be determined by the exposure time determining unit 8 based on the brightness of the imaging device 100's environment. For example, the exposure time determining unit 8 may (i) take a long exposure time when the environment is bright or (ii) take a short exposure time when the environment is dark. The exposure time may also be determined via the user instruction (capturing a fast-moving object or capturing scenery).

The focus lens shift pattern determining unit 9 determines the focus shift patterns shown, for example, in FIGS. 7 to 10, based on focus lens initial position information detected by the focus lens initial position detecting unit 7 and exposure time information determined by the exposure time determining unit 8. Then the focus lens shift pattern determining unit 9 determines a shift pattern, which conforms to the focus shift patterns, of the focus lens 20, and informs the exposure and focus shift synchronization managing unit 10 of the determined shift pattern.

Based on the shift pattern, the exposure and focus shift synchronization managing unit 10 manages the focus lens shift control unit 4 and the shutter operation instructing unit 5, so that the shift control of the focus lens 20 and the start and the end of the exposure synchronize with each other. In other words, the exposure and focus shift synchronization managing unit 10 gives the shutter operation instructing unit 5 an instruction to start the exposure. At the same time, the exposure and focus shift synchronization managing unit 10 gives the focus lens shift control unit 4 an instruction, so that the focus lens shift control unit 4 causes the focus lens 20 to shift, within the exposure time, based on the shift pattern determined by the focus lens shift pattern determining unit 9.

On receiving the exposure start instruction, the shutter operation instructing unit 5 causes the shutter 3 to open. After a predetermined exposure time elapses, the exposure and focus shift synchronization managing unit 10 gives the shutter operation instructing unit 5 an exposure end instruction. On receiving the exposure end instruction, the shutter operation instructing unit 5 causes the shutter 3 to close. Furthermore, based on the shift pattern determined by the focus lens shift pattern determining unit 9, the focus lens shift control unit 4 moves the focus lens 20 so that the focal point (i) moves from the focal initial position as soon as the exposure starts, and (ii) arrives at the focal initial position again as soon as the exposure ends.

When the optical image of the object is formed on the imaging device 1 in the above approach, the formed optical image is converted in an electric signal (image signal) by the imaging device 1. Then the image signal is transmitted to the image-restoration processing unit 11. Simultaneously, the exposure and focus shift synchronization managing unit 10 informs the image-restoration processing unit 11 that the exposure has ended, and that the image capturing has been carried out using the focus shift technique which is based on the F-DOF.

Upon receiving the image signal, the image-restoration processing unit 11 reads the PSF data from the PSF storage unit 12 for restoring an image, and carries out image-restoration processing. Specifically, a previously-measured or a simulation-oriented blur pattern caused by the focus shift is obtained in advance. The PSF storage unit 12 holds the obtained blur pattern as the PSF data. It is noted that various techniques are known for restoring an image, such as the Wiener Filter, and the Lucy-Richardson. Any of the techniques may be employed. Then the image-restoration processing unit 11 records, on the image data recording unit 13, the restored image signal as image data.

Figure 5:
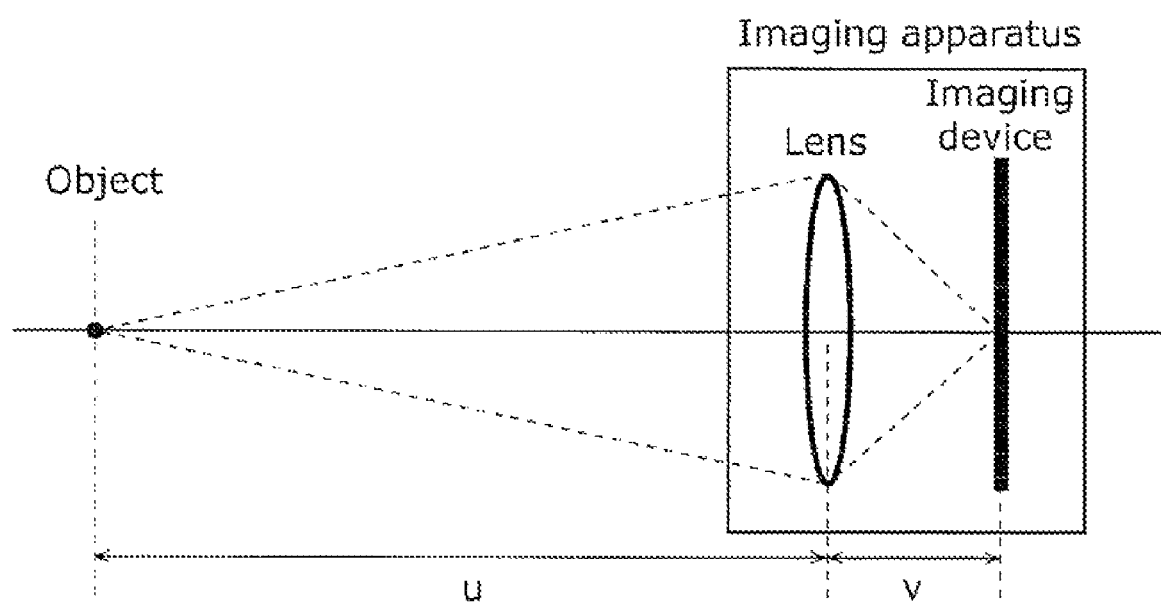
FIG. 5 defines a positional relationship between an object-space distance u and an image-space distance v.

Typically, in the Gaussian lens law, the following relationship (Expression 1) holds where the distance between the object and the lens 2 is the object-space distance u, the distance between the lens 2 and the imaging device 1 is the image-space distance v, and the focal length is f as shown in FIG. 5:

$$\frac{1}{f} = \frac{1}{u} + \frac{1}{v}.$$ Expression 1

Figure 6:
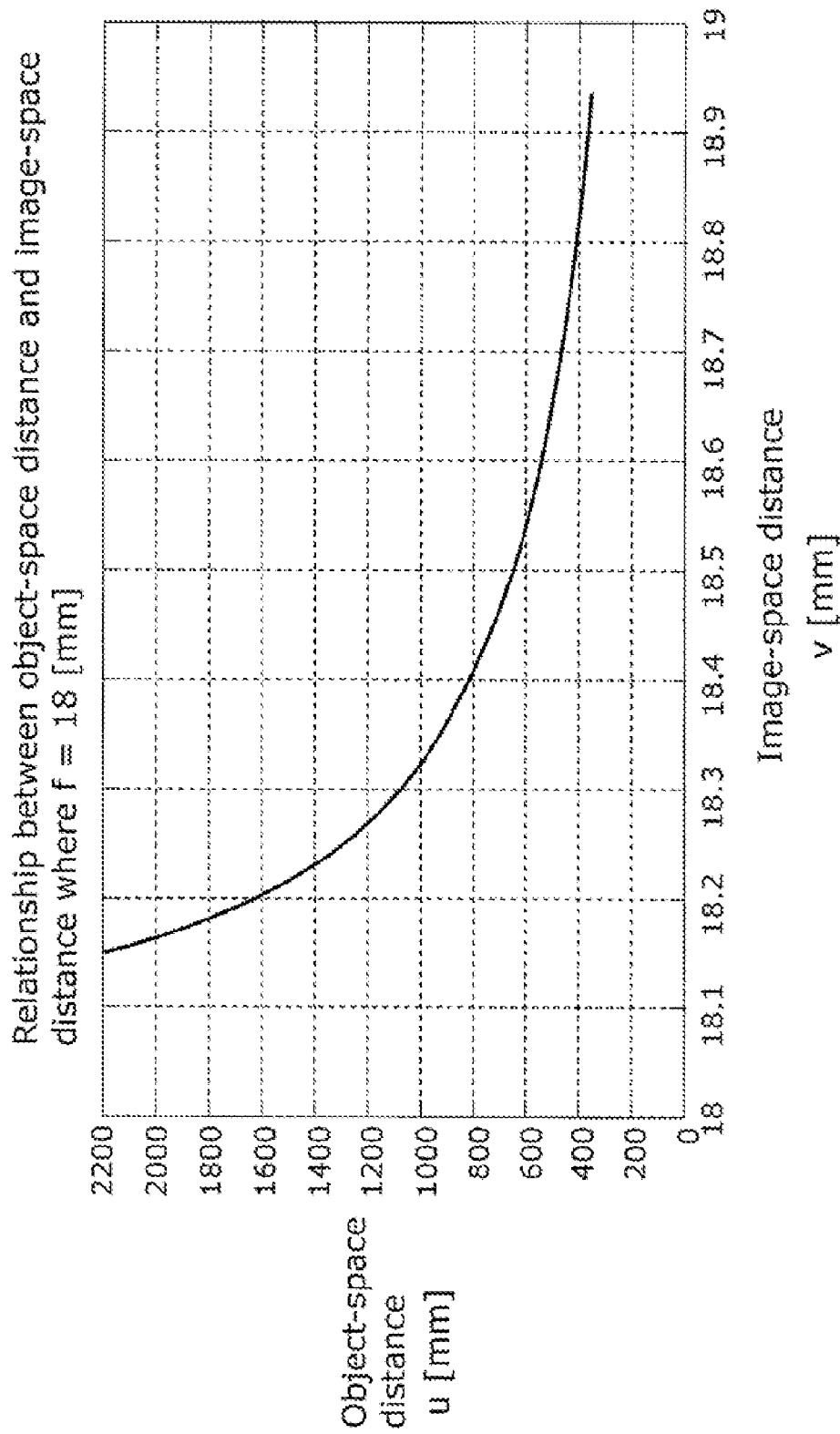
FIG. 6 exemplifies a relationship between the object-space distance u and the image-space distance v.

When there are two or more lenses, the principal point is regarded as the position of the lens. As an example, FIG. 6 shows the relationship between the object-space distance u and the image-space distance v when f is 18 [mm]. When the focus lens 20 shifts, the image-space distance v between the principal point and the imaging device shifts. Here, the shift control instruction is given to the focus lens 20 so that the focal position shifts on the imaging device plane at a constant speed. Accordingly, the image-space distance v changes at a constant speed.

It is noted that, as shown in FIG. 6, the shift of the image-space distance v at a constant speed does not necessarily mean the shift of the object-space distance u at a constant speed. Here the object-space distance u is a distance between the front focal plane and the principal point. Moreover, the ordinates in FIGS. 3 to 10 indicate the image-space distance v. In other words, it is noted that the magnitude relation reverses between (i) the exposure time and the object-space distance u and (ii) the exposure time and the image-space distance v.

Specifically, the nearest end and the farthest end of the object-space distance u have the magnitude relation reversed in the image-space distance.

Figure 7:
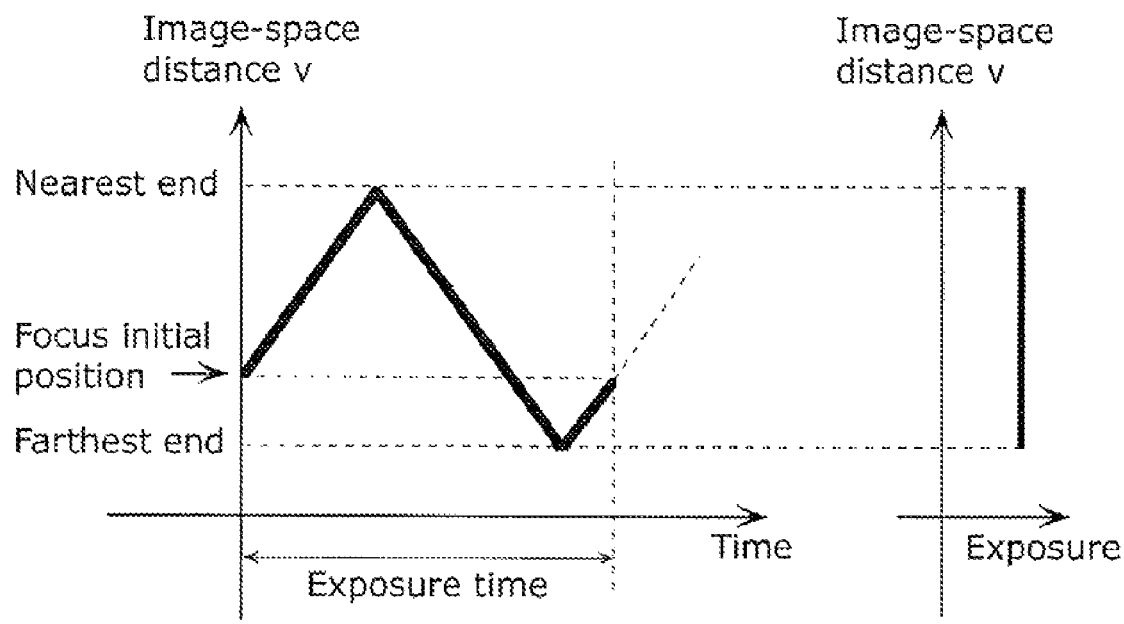
FIG. 7 exemplifies a shift pattern of a focus lens or an imaging device.

FIG. 7 shows that the focal position shifts from the focal initial position to the nearest end of the object-space, arrives at the nearest end, and immediately turns around to shift to the farthest end. Once arriving at the farthest end, the focal position immediately turns around again to shift to the focal initial position. When shifting, the focal position travels at a constant speed in principle. The traveling speed is determined such that the focal position makes one reciprocal travel in the exposure time determined by the exposure time determining unit 8.

The reason for traveling at the constant speed in principle is that the image restoration processing using a uniform restoration PSF requires making a uniform blur in the object-space-distance direction. In order to obtain the uniform blur, the shift in the image-space has to be carried out at a constant speed, and the exposure has to be constant from the nearest end to the farthest end.

Figure 8:
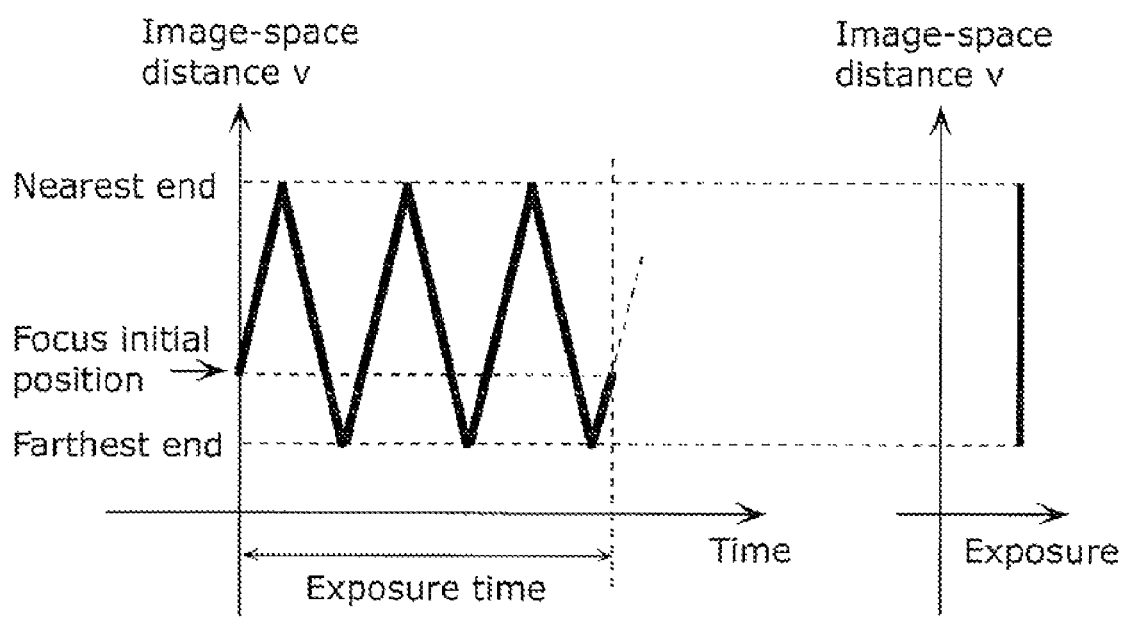
FIG. 8 exemplifies a shift pattern of the focus lens or the imaging device.

FIG. 8 shows the case where the shift pattern in FIG. 7 repeats three times within the exposure time. As shown above, the exposure can be kept constant from the nearest end to the farthest end even though the focal position reciprocally travels in integral times.

Figure 9:
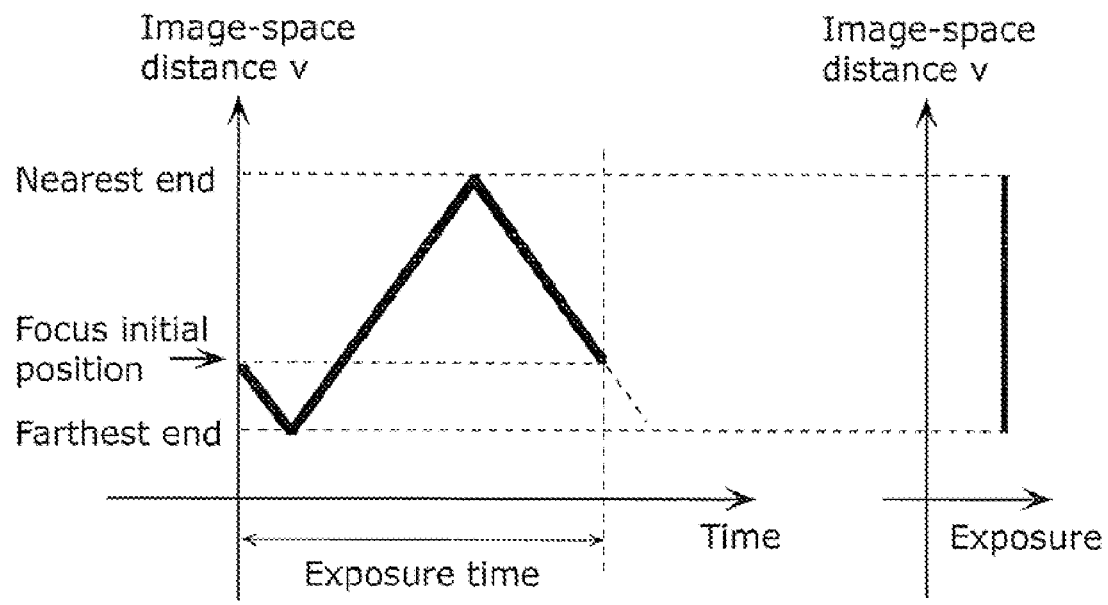
FIG. 9 exemplifies a shift pattern of the focus lens or the imaging device.

FIG. 9 exemplifies a shift pattern whose the focal position shifts opposite the shift pattern in FIG. 7. The focal position shifts from the focal initial position to the farthest end of the object-space, arrives at the farthest end, and immediately turns around to shift to the nearest end. Once arriving at the nearest end, the focal position immediately turns around again to shift to the focal initial position. When shifting, the focal position travels at a constant speed in principle. The traveling speed is determined such that the focal position makes one reciprocal travel in the exposure time determined by the exposure time determining unit 8. As described above, the exposure can be kept constant from the nearest end to the farthest end even though the order of the nearest end and the farthest end is reversed.

Figure 10:
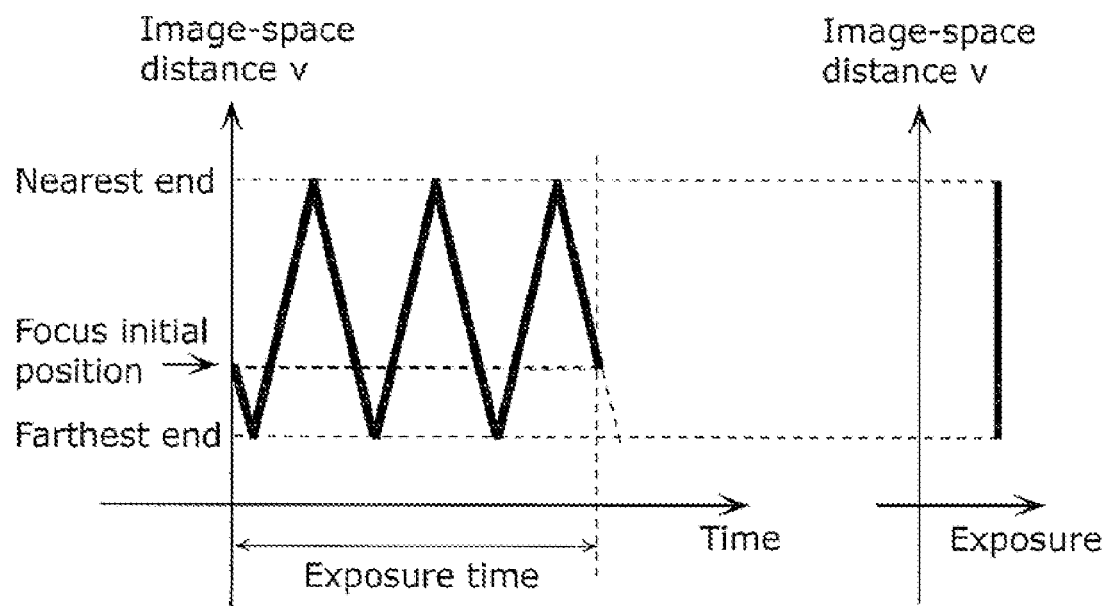
FIG. 10 exemplifies a shift pattern of the focus lens or the imaging device.

FIG. 10 shows the case where the focal position shown in the shift pattern in FIG. 9 makes three reciprocal travels within the exposure time. As shown the above, the exposure can be kept constant from the nearest end to the farthest end even though the focal position having an opposite shift pattern makes reciprocal travels in integral times.

Figure 15:
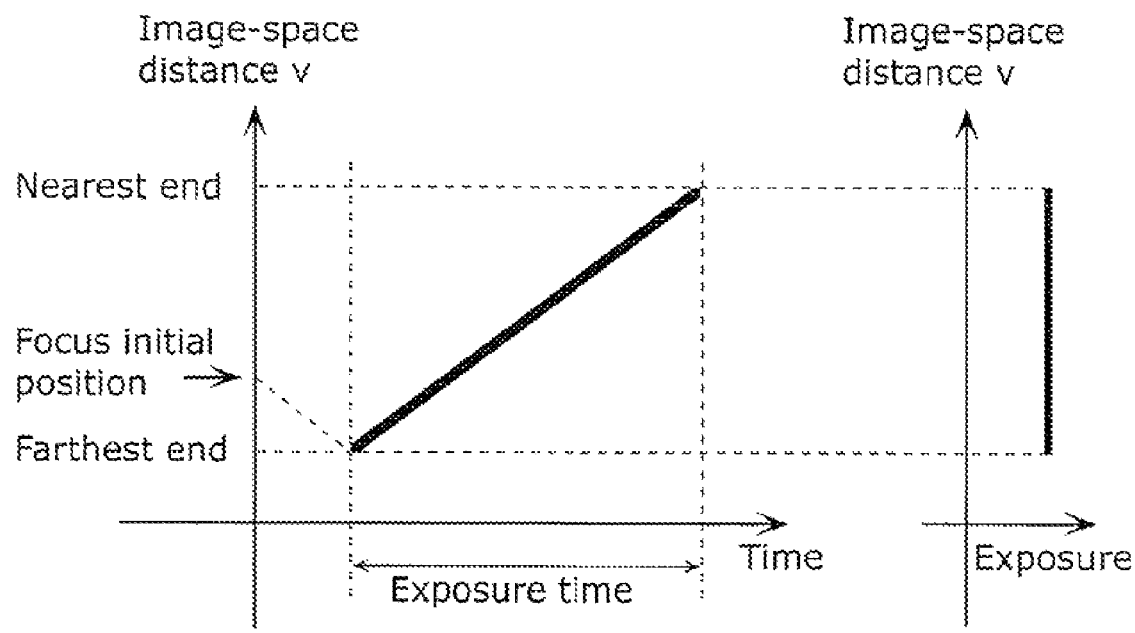
FIG. 15 exemplifies a conventional shift pattern of a focus lens or an imaging device.
Figure 16:
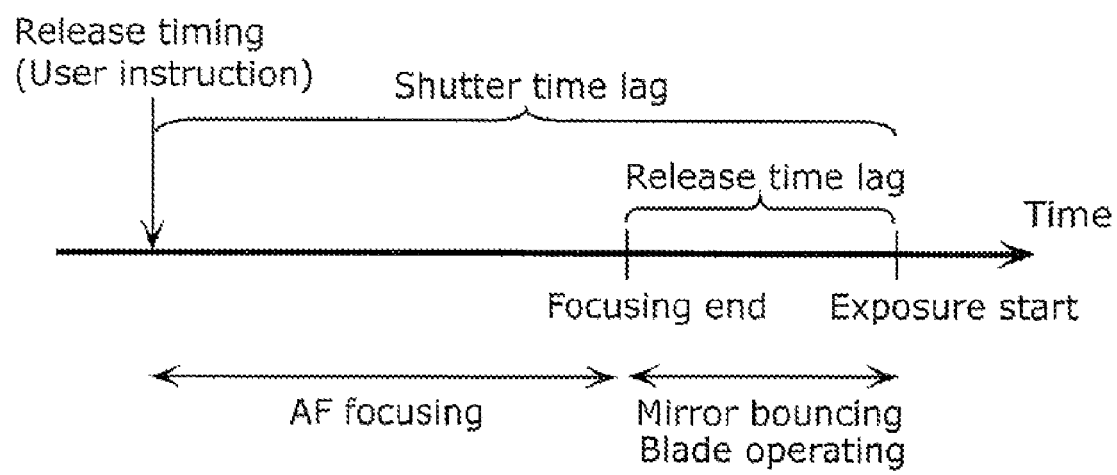
FIG. 16 shows a relationship between a shutter time lag and a release time lag.

It is noted that in the case where the focal position shifts at a constant speed as shown in the conventional shift pattern in FIG. 15 and in the shift patterns in FIGS. 7 to 10 according to Embodiment 1 of the present invention, the exposure at the nearest end and the farthest end is not constant in a narrow sense, compared with the exposure in the center part. As seen from a defocus pattern which a typical lens has, the sharpest image of the object is obtained at the focal point. In the foreground and the background, however, the sharpness of the image is gradually lost as the object leaves the focal point.

Since the shift discontinues at the nearest end and at the farthest end, the sharpness cannot be obtained by the defocus pattern provided in either the nearest-end side or the farthest-end side whichever shows no shift. As a result, the nearest end and the farthest end show less sharpness than the center part shows. In order to compensate the less sharpness, the shift speed at the nearest end and the farthest end may be decreased compared with the shift speed in the center part. Here, it is noted that the time of the focal position reciprocally shifting in integer times lasts as long as the exposure time.

Carrying out the aforementioned control, the above-structured imaging apparatuses 100 and 200 can significantly reduce the shutter time lag, while maintaining the features of the F-DOF; namely, the high image quality, the effectiveness in the EDOF, the degree of arbitrarily in setting the EDOF range, and the ease of switching between the EDOF capturing and the regular image capturing.

Embodiment 2

An imaging apparatuses according to Embodiment 2 of the present invention shall be described with reference to FIGS. 11 and 12.

Figure 11:
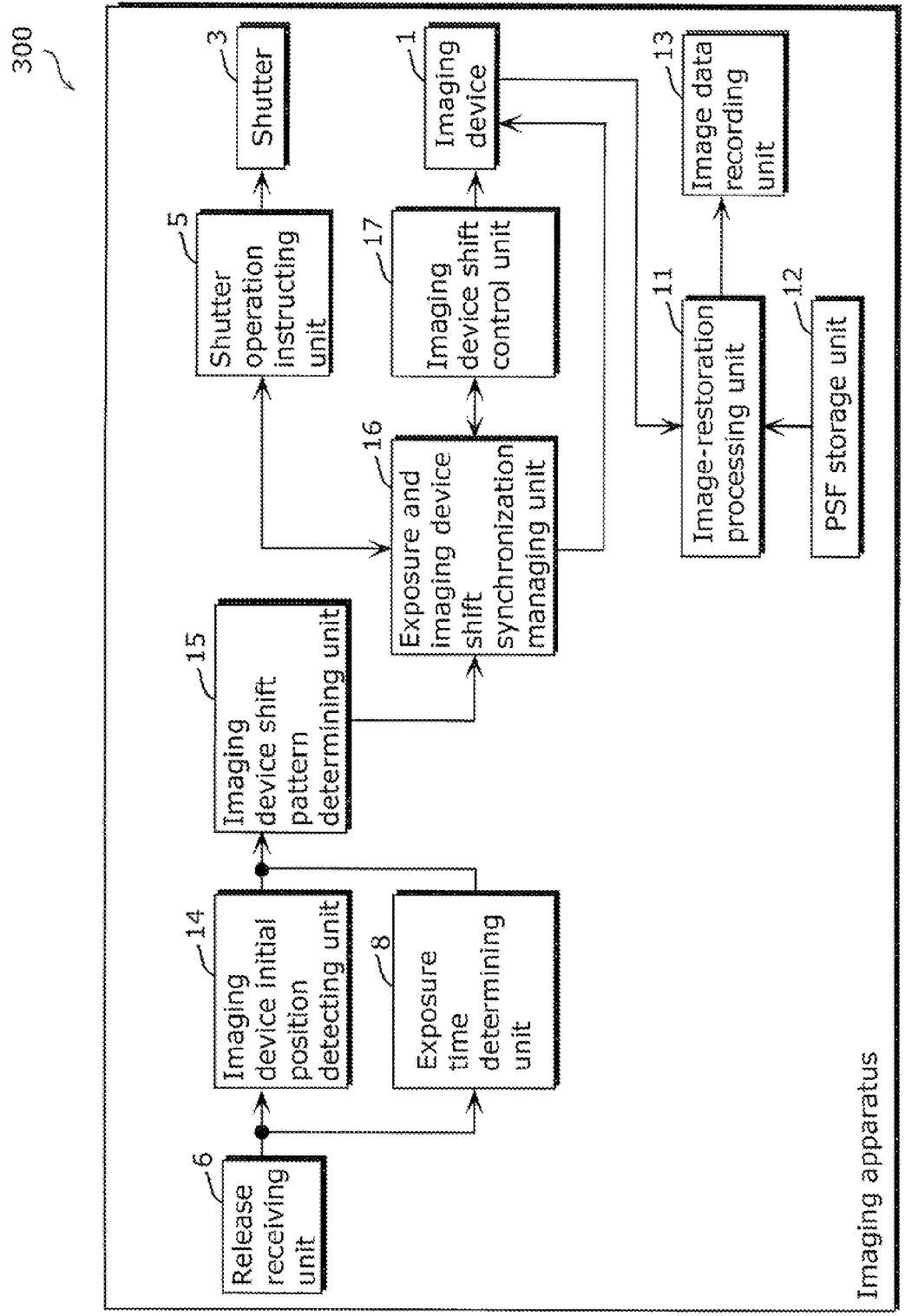
FIG. 11 depicts a block diagram showing a detailed structure of an imaging apparatus according to Embodiment 2 of the present invention.

FIG. 11 shows a detailed structure of an imaging apparatus 300 according to Embodiment 2. The imaging apparatus 300 in FIG. 11 includes the imaging device 1, the shutter 3, the shutter operation instructing unit 5, the release receiving unit 6, the exposure time determining unit 8, the image-restoration processing unit 11, the PSF storage unit 12, the image data recording unit 13, the imaging device initial position detecting unit 14, the imaging device shift pattern determining unit 15, the exposure and imaging device shift synchronization managing unit 16, and the imaging device shifting control unit 17.

It is noted that the following constituent features in FIGS. 1 and 11 correspond with each other: the imaging device 110 with the imaging device 1, the lens 120 with the lens 2, the initial focal point detecting unit 130 with the imaging device initial position detecting unit 14, the shift pattern determining unit 140 with the imaging device shift pattern determining unit 15, and the shift control unit 150 with the imaging device shifting control unit 17. Furthermore, the imaging apparatus 300 also includes the lens 2 including the focus lens 20 whose details shall be omitted.

When the release receiving unit 6 receives an exposure start instruction from the user in the above-structured imaging apparatus 300, the imaging device initial position detecting unit 14 detects the position (initial position) of the imaging device 1 at that time.

The exposure time determining unit 8 determines capturing parameters including a shutter speed (exposure time) and an f-number. The exposure time may be determined by the exposure time determining unit 8 based on the brightness of the imaging device 300's environment. For example, the exposure time determining unit 8 may (i) take a long exposure time when the environment is bright or (ii) take a short exposure time when the environment is dark. The exposure time may also be determined via the user instruction (capturing a fast-moving object or capturing scenery).

The exposure and focus shift synchronization managing unit 16 gives the exposure start instruction to the imaging device shifting control unit 17 and the shutter operation instructing unit 5, and manages the imaging device shifting control unit 17 and the shutter operation instructing unit 5, so that the shift control of the imaging device 1 and the start and the end of the exposure synchronize with each other. In other words, the exposure and focus shift synchronization managing unit 10 gives the shutter operation instructing unit 5 an instruction to start the exposure. At the same time, the exposure and focus shift synchronization managing unit 10 gives the imaging device shift control unit 17 an instruction, so that the imaging device shift control unit 17 causes the imaging device 1 to shift, within the exposure time, based on the shift pattern determined by the imaging device shift pattern determining unit 15.

It is noted that the imaging device 1 shifts at a constant speed. On receiving the exposure start instruction, the shutter operation instructing unit 5 causes the shutter 3 to open. After a predetermined exposure time elapses, the exposure and focus shift synchronization managing unit 16 gives the shutter operation instructing unit 5 an exposure end instruction. On receiving the exposure end instruction, the shutter operation instructing unit 5 causes the shutter 3 to close. Furthermore, based on the shift pattern determined by the imaging device shift pattern determining unit 15, the imaging device shifting control unit 17 moves the imaging device 1 so that the focal point (i) moves from the focal initial position as soon as the exposure starts, and (ii) arrives at the focal initial position again as soon as the exposure ends.

When the optical image of the object is formed on the imaging device 1 in the above approach, the formed optical image is converted in an electric signal (image signal) by the imaging device 1. Then the image signal is transmitted to the image-restoration processing unit 11. Simultaneously, the exposure and focus shift synchronization managing unit 16 informs the image-restoration processing unit 11 that the exposure has ended, and the image capturing has been carried out using imaging device shift technique which is based on the F-DOF. Other part of the structure is similar to the structure shown in FIG. 3 for shifting the focus lens 20.

Figure 12:
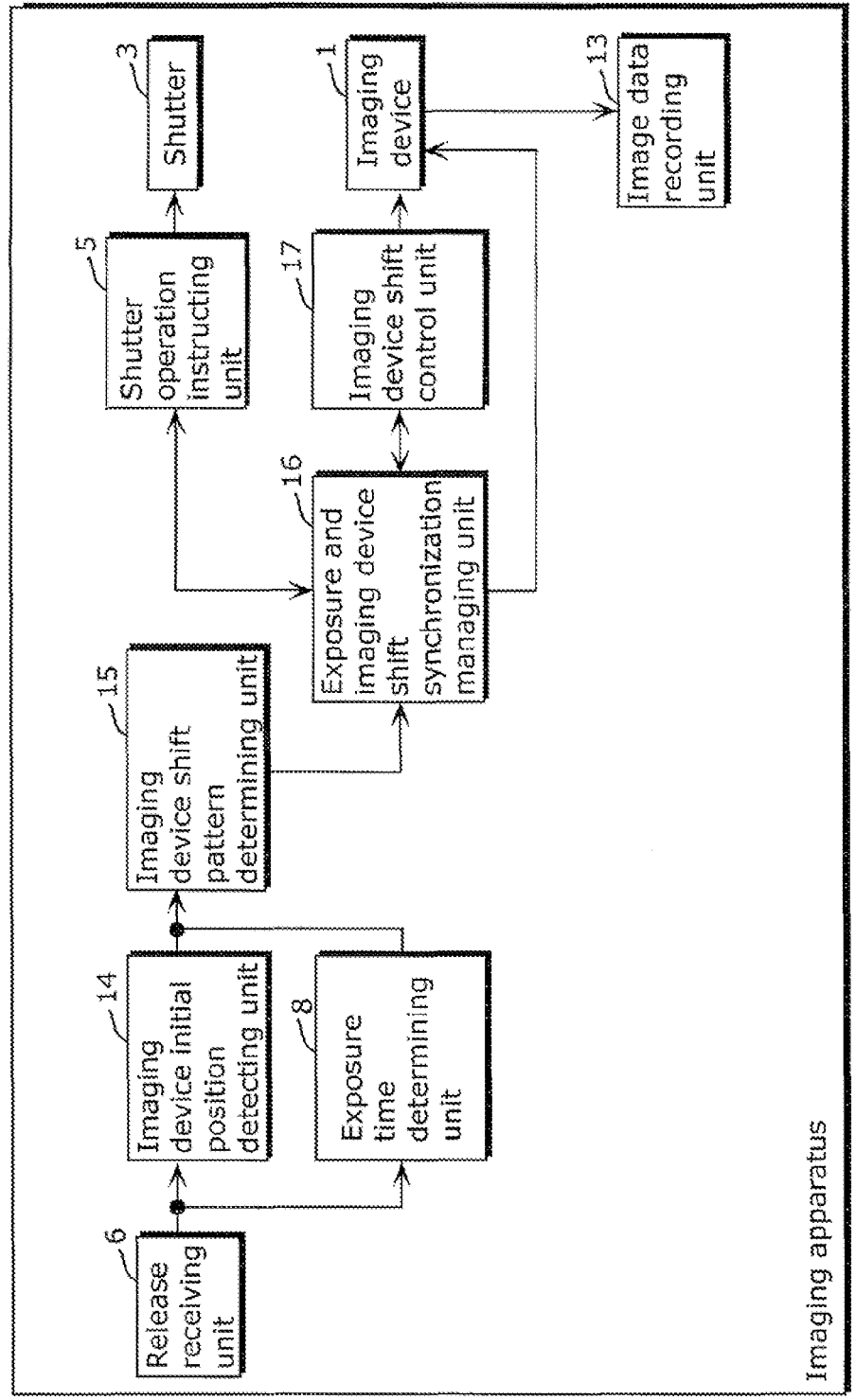
FIG. 12 depicts a block diagram showing a detailed structure of an imaging apparatus according to Embodiment 2 of the present invention.
Figure 13:
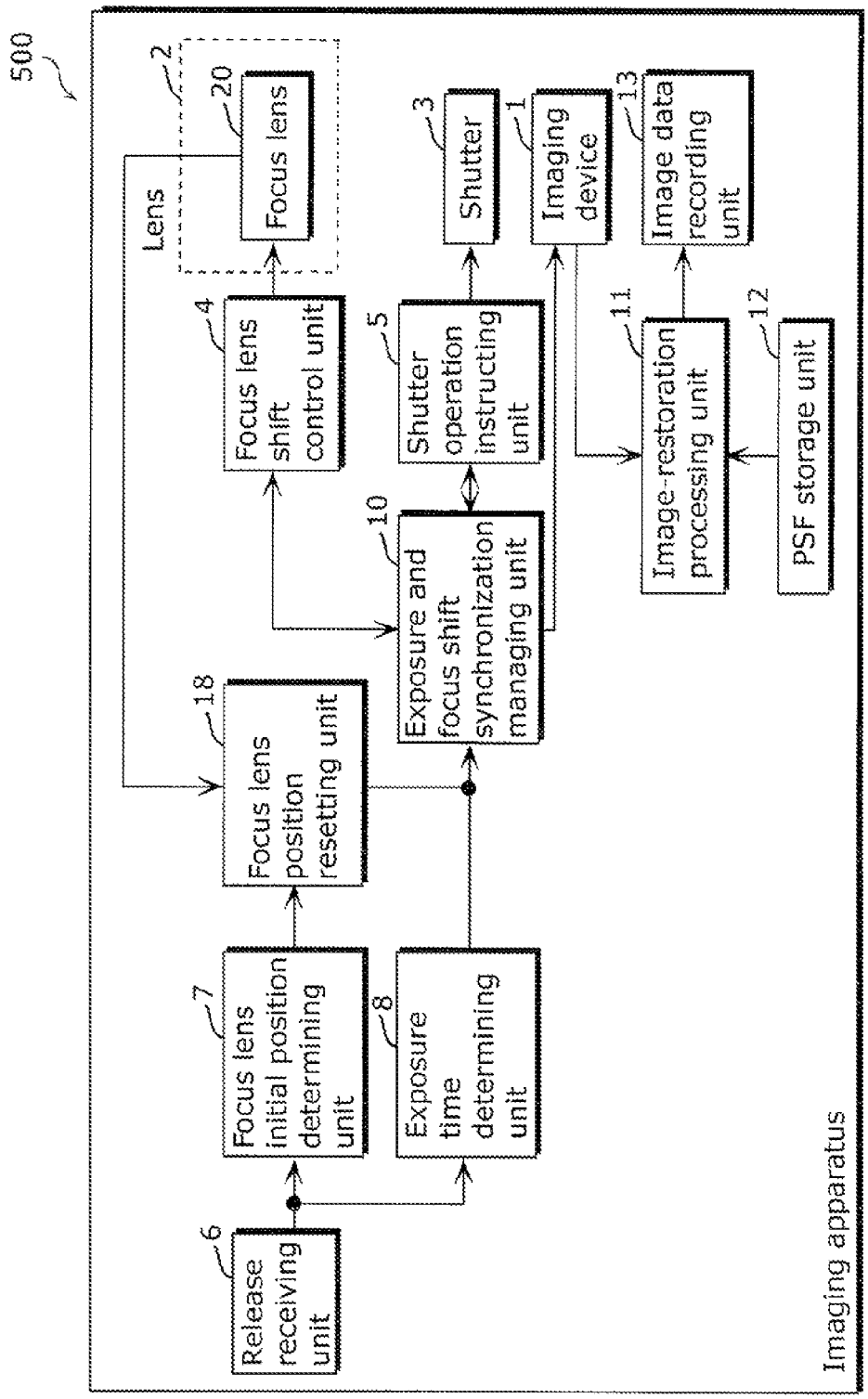
FIG. 13 depicts a block diagram showing a conventional imaging apparatus.
Figure 14:
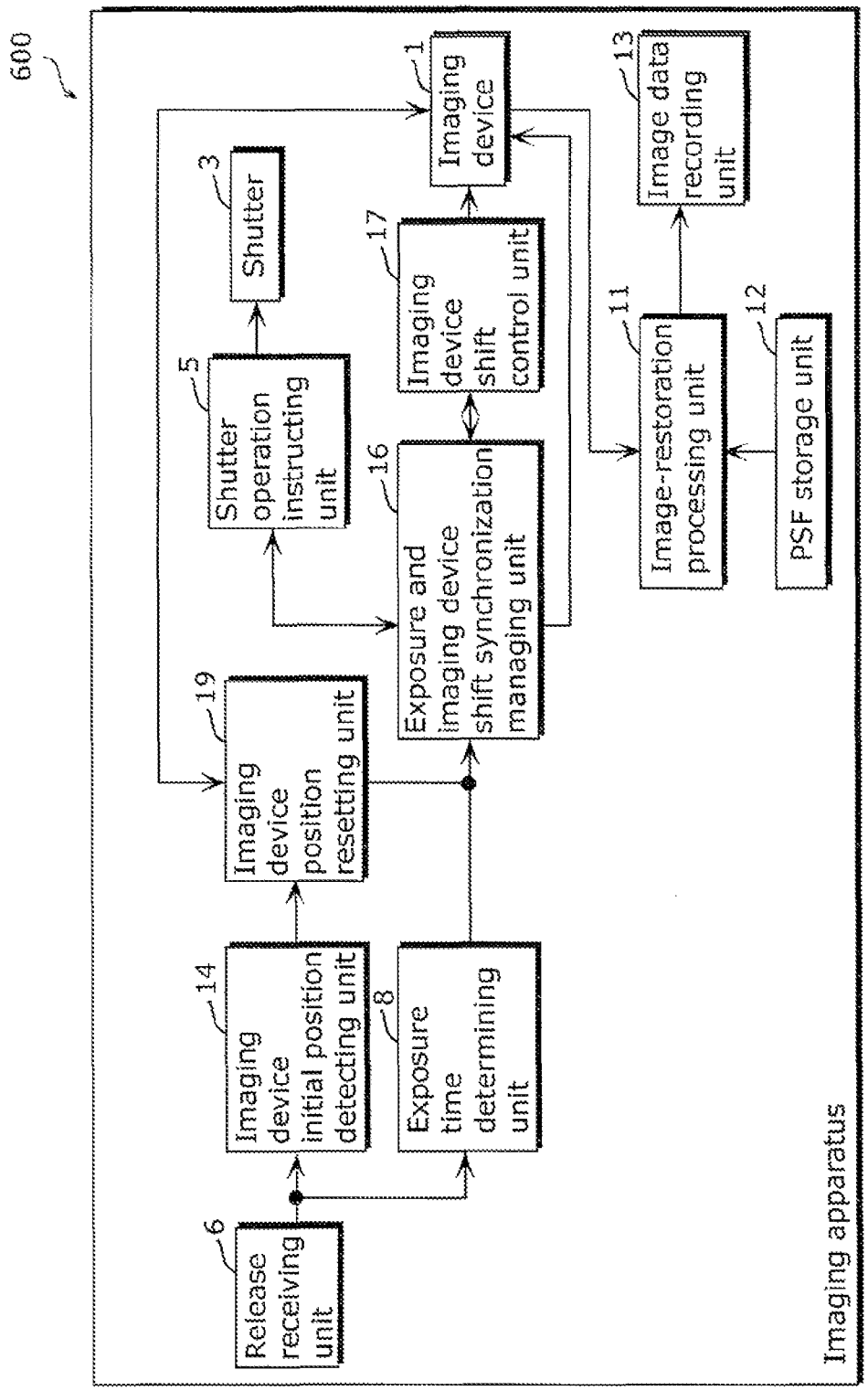
FIG. 14 depicts a block diagram showing a conventional imaging apparatus.

FIG. 12 shows a detailed structure of an imaging apparatus 400 according to Embodiment 2. Other than the fact that the image-restoration processing unit 11 and the PSF storage unit 12 are omitted from the imaging apparatus 400, the structure and effects of the imaging apparatus 400 are similar to those of the imaging apparatus 300 shown in FIG. 11. Compared with the imaging apparatus 300 shown in FIG. 11, the imaging apparatus 400 is characterized by directly recording, on the image data recording unit 13, an image obtained through the exposure. This structure intends to achieve the image-restoration processing to be executed not in the imaging apparatus 400 but on an external apparatus, such as a personal computer, an image viewer, or a network server.

The imaging device shift pattern determining unit 15 determines the focus shift patterns shown, for example, in FIGS. 7 to 10 based on imaging device initial position information detected by the imaging device initial position detecting unit 14 and exposure time information determined by the exposure time determining unit 8. Then the imaging device shift pattern determining unit 15 (i) determines a shift pattern, which conforms to the focus shift patterns, of the imaging device 1, and (ii) informs the exposure and focus shift synchronization managing unit 10 of the determined shift pattern.

When the imaging device 1 shifts, as FIG. 5 shows clearly, the focal shift pattern is the shift pattern of the imaging device 1 itself unless the position of the lens 2 shifts. Based on the shift pattern, the exposure and imaging device shift synchronization managing unit 16 manages to synchronize the start and the end of the exposure with the operations of the imaging device shifting control unit 17 and the shutter operation instructing unit 5.

The shift pattern of the imaging device 1 conforms to the shift patterns in FIGS. 7 to 10 according to Embodiment 1. Embodiment 2 is different from Embodiment 1 in that the imaging device 1 itself shifts in Embodiment 2; otherwise, both of the embodiments share the same shift pattern.

Carrying out the aforementioned control, the above-structured imaging apparatuses 300 and 400 can significantly reduce the shutter time lag, while maintaining the features of the F-DOF; namely, the high image quality the effectiveness in the EDOF, the degree of arbitrarily setting the EDOF range, and the ease of switching between the EDOF capturing and the regular image capturing.

Although only some exemplary embodiments of this invention have been described in detail above, those skilled in the art will readily appreciate that many modifications are possible in the exemplary embodiments without materially departing from the novel teachings and advantages of this invention.

Furthermore, at least some of processing units included in the imaging apparatuses according to the embodiments may be configured from an LSI (Large-Scale Integration); namely, an integrated circuit. These processing units may be made as separate individual chips, or as a single chip to include a part or all of the processing units.

Moreover, the means for circuit integration is not limited to an LSI; instead, a dedicated circuit or a general-purpose processor is employed as the means. In addition, it is also acceptable to use a Field Programmable Gate Array (FPGA) that is programmable after the LSI has been manufactured, or to use a reconfigurable processor in which connections and settings of circuit cells within the LSI are reconfigurable.

In addition, some of the functions of the imaging apparatuses according to the embodiments of the present invention may be carried out by a processor, including the CPU, executing a program.

Furthermore, the present invention may be the program, and a non-transitory computer-readable recording medium which stores the program. Obviously, the program can be distributed via a transmission media, such as the Internet.

Moreover, at least some of the functions of the imaging apparatuses and the modifications thereof according to the embodiments may be combined.

In addition, all of the above-shown figures are exemplified to describe the present invention in detail. Thus the present invention shall not be limited to the exemplified figures.

Furthermore, all such modifications are intended to be included within the scope of this invention.

INDUSTRIAL APPLICABILITY

An imaging apparatus and an imaging method of the present invention can significantly reduce a shutter time lag, which is a weakness of the F-DOF, by employing a devised technique to move an imaging device or a focus lens during exposure.

The present invention is effective in a field of, for example, household- and industrial-use imaging apparatuses (digital still cameras).

REFERENCE SIGNS LIST

1 Imaging device
2 Lens
20 Focus lens
3 Shutter
4 Focus lens shift control unit
5 Shutter operation instructing unit
6 Release receiving unit
7 Focus lens initial position determining unit
8 Exposure time determining unit
9 Focus lens shift pattern determining unit
10 Exposure and focus shift synchronization managing unit
11 Image-restoration processing unit
12 PSF storage unit
13 Image data recording unit
14 Imaging device initial position detecting unit
15 Imaging device shift pattern determining unit
16 Exposure and imaging device shift synchronization managing unit
17 Imaging device shifting control unit
18 Focus lens position resetting unit
19 Imaging device initial position resetting unit
100, 200, 300, 400, 500, 600, 1000 Imaging apparatus
130 Initial focal point detecting unit
140 Shift pattern determining unit
150 Shift control unit

The invention claimed is:

1. An imaging apparatus comprising:
an imaging device;
a lens which collects light on said imaging device, and forms an image;
an initial focal point detecting unit configured to detect a positional relationship between said imaging device and said lens to specify an initial focal point which is a focal point found when an exposure start instruction is received from a user;
a shift pattern determining unit configured to determine a shift pattern of the focal point, such that the focal point in an exposure time moves from the initial focal point, passes through both of a nearest end and a farthest end of a predetermined range of focus at least once, and returns to the initial focal point, the initial focal point being specified by the positional relationship (i) determined by said initial focal point detecting unit, and (ii) observed between said imaging device and said lens; and
a shift control unit configured to move one of said imaging device and said lens based on the shift pattern determined by said shift pattern determining unit, such that the focal point moves from the initial focal point as soon as exposure starts, and arrives at the initial focal point again as soon as the exposure ends.

2. The imaging apparatus according to claim 1, further comprising
an exposure time determining unit configured to determine the exposure time according to an imaging scene,
wherein said shift pattern determining unit is configured to increase the number of reciprocal travels as the exposure time determined by said exposure time determining unit is longer, the number of reciprocal travels indicating frequency of the shift pattern to be carried out during the exposure time.

3. The imaging apparatus according to claim 1,
wherein said shift pattern determining unit is configured to determine the shift pattern of the focal point, such that the focal point in the exposure time moves in the order of the initial focal point, the nearest end of the range of focus, and the farthest end of the range of focus, and returns again to the initial focal point.

4. The imaging apparatus according to claim 1,
wherein said shift pattern determining unit is configured to determine the shift pattern of the focal point, such that the focal point in the exposure time moves in the order of the initial focal point, the farthest end of the range of focus, and the nearest end of the range of focus, and returns again to the initial focal point.

5. The imaging apparatus according to claim 1,
wherein shift control unit is configured to shift the focal point by moving said lens.

6. The imaging apparatus according to claim 1,
wherein shift control unit is configured to shift the focal point by moving said imaging device.

7. The imaging apparatus according to claim 1, further comprising:
a Point Spread Function (PSF) storage unit configured to store a restoration PSF in advance;
an image-restoration processing unit configured to carry out image-restoration processing on image data generated by said imaging device, using the restoration PSF; and
an image data recording unit configured to record an image restored by said image-restoration processing unit.

8. An imaging method of an imaging apparatus obtaining an image, the imaging apparatus including an imaging device and a lens which collects light on the imaging device, and forms an image, said imaging method comprising:
detecting a positional relationship between the imaging device and the lens to specify an initial focal point which is a focal point found when an exposure start instruction is received from a user;
determining a shift pattern of the focal point, such that the focal point in an exposure time moves from the initial focal point, passes through both of a nearest end and a farthest end of a predetermined range of focus at least once, and returns to the initial focal point, the initial focal point being specified by the positional relationship (i) determined in said detecting, and (ii) observed between the imaging device and the lens; and
moving one of the imaging device and the lens based on the shift pattern determined in said determining, such that the focal point moves from the initial focal point as soon as exposure starts, and arrives at the initial focal point again as soon as the exposure ends.

* * * * *